(12) United States Patent
Lasecki et al.

(10) Patent No.: US 9,150,359 B2
(45) Date of Patent: Oct. 6, 2015

(54) LINK MEMBER HAVING A CURVED BEARING SURFACE

(75) Inventors: Jonathan R. Lasecki, Strasburg, VA (US); Darroll Joseph Neely, Gerrardstown, WV (US)

(73) Assignee: ASHWORTH BROS., INC., Fall River, MA (US)

( * ) Notice: Subject to any disclaimer, the term of this patent is extended or adjusted under 35 U.S.C. 154(b) by 237 days.

(21) Appl. No.: 13/588,449

(22) Filed: Aug. 17, 2012

(65) Prior Publication Data

US 2014/0048392 A1    Feb. 20, 2014

(51) Int. Cl.
| | |
|---|---|
| *B65G 17/06* | (2006.01) |
| *B65G 15/30* | (2006.01) |
| *B65G 39/20* | (2006.01) |

(52) U.S. Cl.
CPC .................................. *B65G 17/063* (2013.01)

(58) Field of Classification Search
None
See application file for complete search history.

(56) References Cited

U.S. PATENT DOCUMENTS

| | | | | |
|---|---|---|---|---|
| 4,867,301 | A | * | 9/1989 | Roinestad et al. ............ 198/852 |
| 4,932,925 | A | | 6/1990 | Roinestad et al. |
| 5,083,659 | A | | 1/1992 | Bode et al. |
| 5,217,110 | A | | 6/1993 | Spangler et al. |
| 5,257,690 | A | | 11/1993 | Dehne |
| 5,566,817 | A | * | 10/1996 | Meeker ......................... 198/848 |
| 5,666,817 | A | * | 9/1997 | Schulak et al. ................. 62/185 |
| 5,954,187 | A | * | 9/1999 | Hager ............................ 198/778 |
| 6,691,862 | B1 | | 2/2004 | Mogens |
| 7,063,207 | B2 | | 6/2006 | Sykora |
| 7,080,729 | B2 | | 7/2006 | Guldenfels et al. |
| 2009/0242360 | A1 | | 10/2009 | Hall |
| 2010/0006404 | A1 | | 1/2010 | Jager |

OTHER PUBLICATIONS

International Search Report, International Patent Application No. PCT/US2013/054832, mailed Oct. 28, 2013.
Written Opinion of the International Searching Authority, International Patent Application No. PCT/US2013/054832, mailed Oct. 28, 2013.

* cited by examiner

*Primary Examiner* — Kavel Singh
(74) *Attorney, Agent, or Firm* — Nixon Peabody LLP; Jeffrey L. Costellia

(57) ABSTRACT

A link member having a curved bearing surface and a conveyor belt comprising a link member having a curved bearing surface are described. The link member can be comprised in any type of conveyor belt, including a grid-type conveyor belt, a smaller-radius grid-type conveyor belt or a flat-wire conveyor belt. The link member eliminates the objectionable noise caused by pivot rods jumping the corner of conventional links having curved bearing surfaces. According to one embodiment, the link member comprises a pair of leg portions, each leg portion comprising a first opening at a distal end and a second opening at a proximal end, and a connecting portion that connects the pair of leg portions, the connecting portion comprising a curved bearing surface between first and second side surfaces. The first and second side surfaces extend in a direction toward the proximal end of the leg portions.

35 Claims, 7 Drawing Sheets

LINK MEMBER HAVING A CURVED BEARING SURFACE

BACKGROUND OF THE INVENTION

1. Field of the Invention

Embodiments of the claimed invention relate to conveyor belt systems, and in particular, to a link member having a curved bearing surface for connecting adjacent rods of a conveyor belt system.

2. Description of Related Art

Conveyor belt systems are used in various industrial fields for material handling and processing purposes. For instance, conveyor systems are used within food processing systems in which food items are placed on the support surface of a conveyor belt and processed, while being conveyed from one location to another. Various types of conveyor belts exist, including modular conveyor belts, which are especially popular in food processing systems. Moreover, conveyor systems are often used in a helical accumulator such as that disclosed in U.S. Pat. No. 5,070,999 to Layne et al. which allows storage of a large number of items in the conveyor system.

Figure 1:
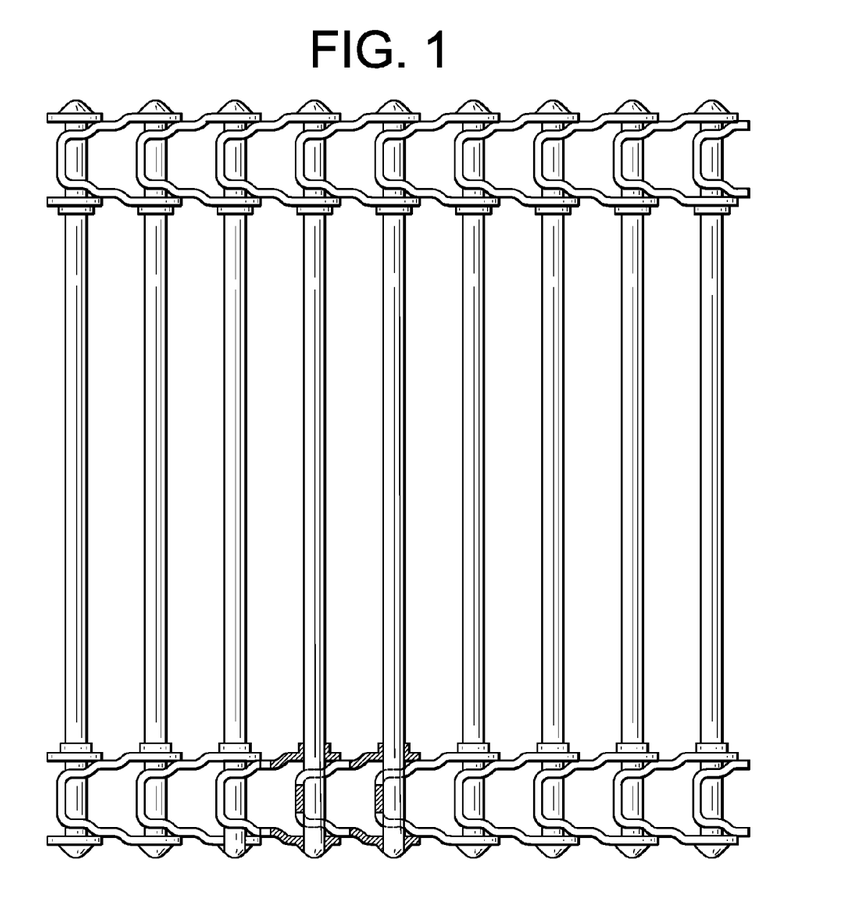
FIG. 1 is a top view of a conventional grid-type conveyor belt.
Figure 2:
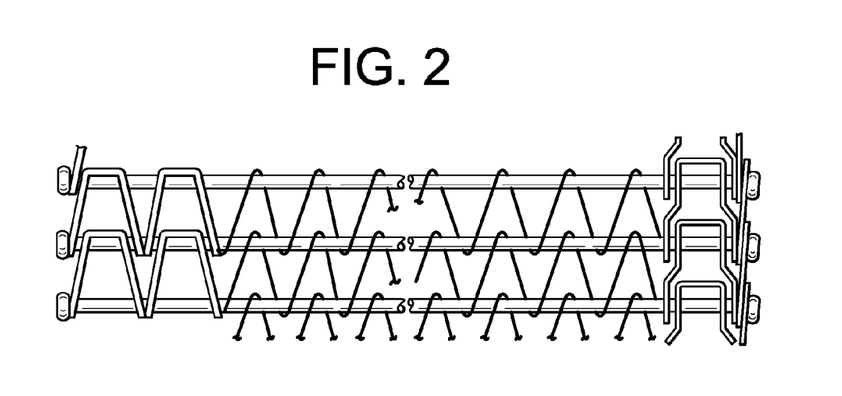
FIG. 2 is a top view of a conventional smaller-radius grid-type conveyor belt.

One type of conveyor belt system comprises transverse rods connected by links disposed along the opposite transverse edges of the belt. For example, the belt can have generally U-shaped nestable links with slotted holes that allow the links to slide on the rods. The relative sliding action between the links and rods provides lateral flexibility which enables the belt to turn right or left, when such nestable links are used on both sides of the belt. When such a belt proceeds around a lateral curve, the rod ends along the inside concave edge of the belt collapse. The opposite transverse ends of the rods along the outside convex edge of the belt either remain at the same pitch as when the belt travels in a straight line direction, such as disclosed in U.S. Pat. No. 3,225,898 to Roinestad, or expand to a greater pitch in order to allow the belt to proceed around a smaller radius, as disclosed in U.S. Pat. No. 4,078,655 to Roinestad and U.S. Pat. No. 4,867,301 to Roinestad et al., each of which is herein incorporated by reference in their entireties. These types of conveyor belts are often referred to as grid-type belts. FIG. 1 illustrates a conventional grid-type conveyor belt as in U.S. Pat. No. 3,225,898 to Roinestad. FIG. 2 illustrates a conventional smaller-radius grid-type conveyor belt as in U.S. Pat. No. 4,867,301 to Roinestad et al.

Figure 3:
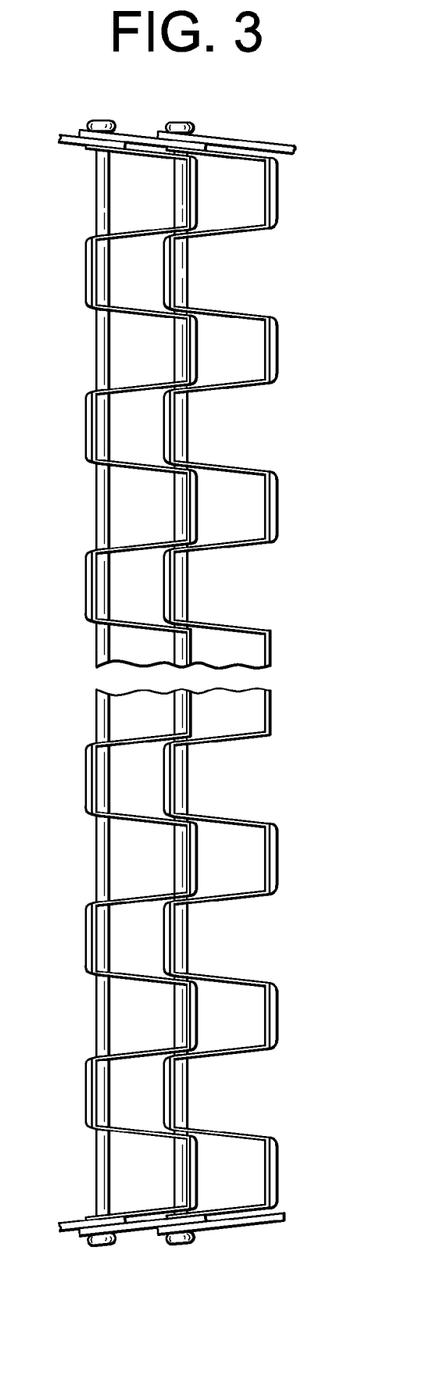
FIG. 3 is a top view of a conventional flat-wire conveyor belt.

Another type of conveyor belt system comprises rows of pickets with repeated bends formed from a flat strip of metal. A plurality of cross rods connect adjacent rows of pickets through openings therein. The openings can be circular and similar in radius to the cross rods so as to create a noncollapsible belt configured for straight travel. Alternatively, the openings can be slotted so as to create a collapsible belt configured for both straight travel of the belt and travel around lateral curves, such as disclosed in U.S. Pat. No. 4,846,339 to Roinestad, herein incorporated by reference in its entirety. These types of conveyor belts are often referred to as flat wire conveyor belts. FIG. 3 illustrates a conventional flat-wire conveyor belt as in U.S. Pat. No. 4,846,339 to Roinestad.

Figure 4:
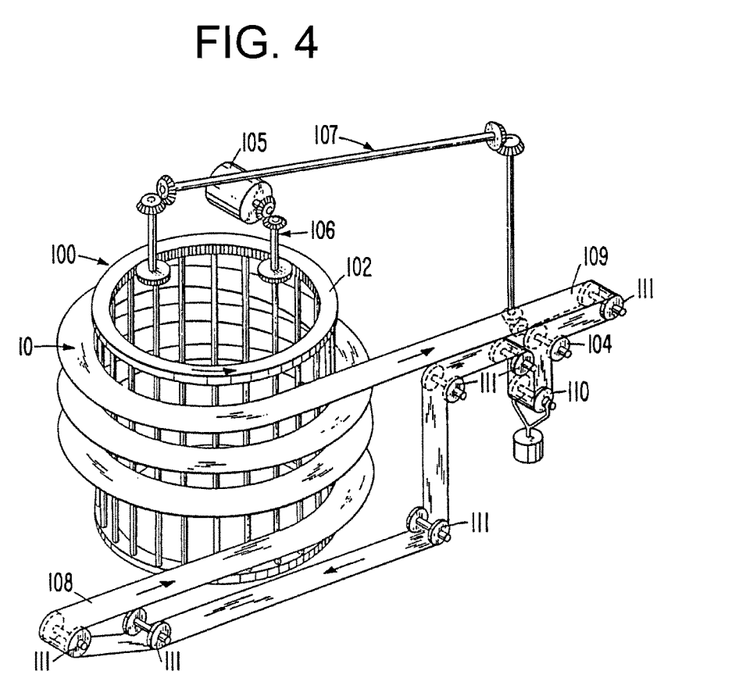
FIG. 4 is a perspective view of a spiral low tension conveying system.

FIG. 4 illustrates a spiral low tension conveying system 100 of the type shown in U.S. Pat. Nos. 4,078,655 and 3,348,659. Since the low tension system is fully described in these patents, which are herein incorporated by reference in their entireties, only a brief description will be given here. In such a low tension system 100, a cage type driving drum 102 frictionally engages the inner edge of a conveyor belt 10 to drive it with relatively low tension through a helical path around the drum. In addition, a positive sprocket drive 104 engages the belt 10 along a straight portion thereof. A motor 105 drives the drum 102 through gearing 106 and also drives the positive sprocket drive 104 through interconnected gearing 107. The belt 10 travels from the sprocket drive 104, past weighted tension take up roller 110 and idler pulleys 111 to a straight loading portion 108, then in helical loops around the drum 102 to a straight discharge portion 109 and around another idler 111 back to the drive sprocket.

Figure 5:
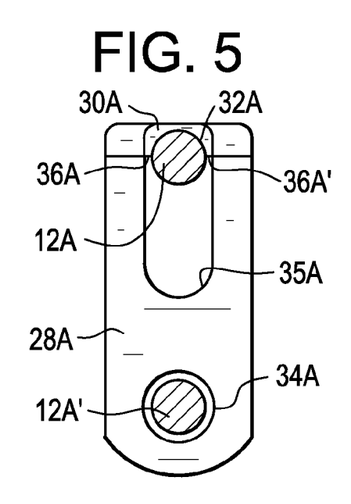
FIG. 5 is a cutaway view of a conveyor belt comprising a conventional link having a curved bearing surface.

FIG. 5 is a cutaway view of a conveyor belt comprising a conventional link having a curved bearing surface, such as that described in U.S. Pat. No. 4,932,925 to Roinestad et al., which is herein incorporated by reference in its entirety. As seen in FIG. 5, each leg portion 28A has a pair of holes 34A, 35A for receiving adjacent rods 12A and 12A'. Hole 35A, which is adjacent to its respective connecting portion 30A, is in the form of an elongate slot, which allows rod 12A to move from a collapsed position during straight line conveying, to an expanded position during conveying about lateral curves. Holes 34A and 35A are positioned at a proximal end and a distal end, respectively, of their respective leg portion 28A.

As shown in FIG. 5, connecting portion 30A connects leg portion 28A to another leg portion (not shown). Connecting portion 30A has a curved bearing surface 32A between first and second side surfaces, 36A and 36A', respectively. In this embodiment, curved bearing surface 32A substantially mates with the outer surface of rod 12A, i.e., curved bearing surface 32A has substantially the same radius as rod 12A. First and second side surfaces 36A and 36A' extend perpendicular to leg portion 28A.

Figure 6:
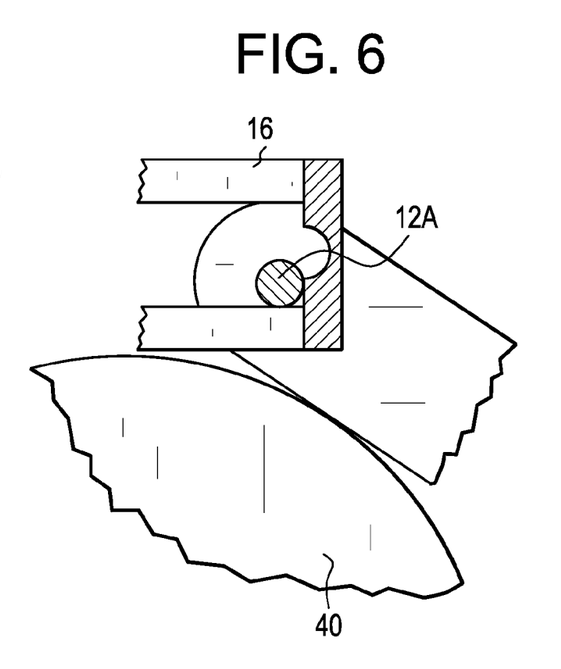
FIG. 6 is a cutaway view of a conveyor belt comprising a conventional link having a curved bearing surface passing around a roller.

Because side surfaces 36A and 36A' expand perpendicular to leg portion 28A within opening 35A, a corner is created in connecting portion 30A between curved bearing surface 32A and side surfaces 36A and 36A'. When link 16A turns tangentially in the expanded position, such as about a roller (e.g., roller 110 of FIG. 4), rod 12A can be forced from curved bearing surface 32A back into opening 35A. This causes rod 12A to jump the corner and creates a potentially objectionable noise. FIG. 6 illustrates this situation in which rod 12A has jumped the corner due to link 16A—s tangential movement about roller 40.

SUMMARY OF THE INVENTION

Thus, there is a need in the art for a link member that eliminates the objectionable noise caused by pivot rods jumping the corner of their respective links when moved tangentially. Embodiments of the invention meet that need and others by providing a link member having a curved bearing surface for connecting adjacent rods of a conveyor belt system. According to one embodiment, the link member comprises a pair of leg portions, each leg portion comprising a first opening at a distal end and a second opening at a proximal end, and a connecting portion that connects the pair of leg portions, the connecting portion comprising a curved bearing surface between first and second side surfaces. The first and second side surfaces extend in a direction toward the proximal end of the leg portions.

A conveyor belt comprising a plurality of link members is also described according to embodiments of the invention. Each of the plurality of link members comprises a pair of leg portions, each leg portion comprising a first opening at a distal end and a second opening at a proximal end, and a connecting portion that connects the pair of leg portions, the connecting portion comprising a curved bearing surface between first and second side surfaces. The first and second side surfaces extend in a direction toward the proximal end of the leg portions. The conveyor belt system further comprises a first pivot rod received in the first opening of each leg portion, and a second pivot rod received in the second opening of each leg portion. The conveyor belt can be any type of conveyor belt, such as a grid-type conveyor belt or a flat wire conveyor belt, as described above.

Thus, in certain embodiments, by providing first and second side surfaces that extend in a direction toward the proximal end of the leg portions, the corner between the curved bearing surface and the side surfaces of prior link elements is removed. Thus, the noise of the pivot rod jumping over the corner when moved about a roller is eliminated.

DETAILED DESCRIPTION

A link member having a curved bearing surface and a conveyor belt comprising a link member having a curved bearing surface are described. In the following description, for purposes of explanation, numerous specific details are set forth in order to provide a thorough understanding of the exemplary embodiments. It is apparent to one skilled in the art, however, that embodiments of the invention can be practiced without these specific details or with an equivalent arrangement.

Figure 7:
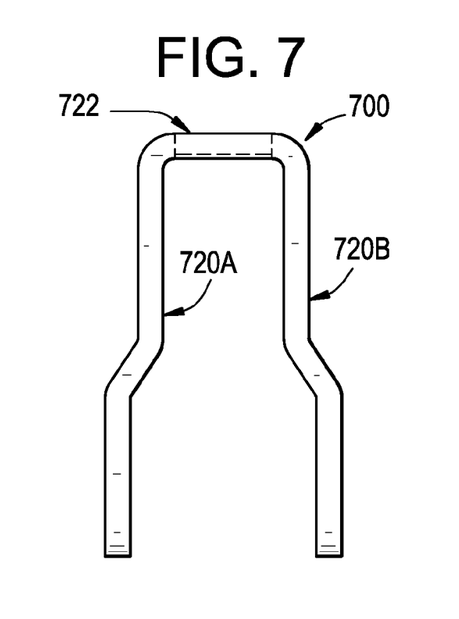
FIG. 7 is a plan view of an improved U-shaped link having a curved bearing surface according to embodiments of the invention.

FIG. 7 is a plan view of an improved U-shaped link 700 having a curved bearing surface. Link 700 can be implemented within grid-type conveyor belts, such as those shown in FIGS. 1 and 2, or within flat wire conveyor belts, such as that shown in FIG. 3. Link 700 has a connecting portion 722 that connects leg portions 720A and 720B. As shown in FIG. 5, leg portions 720A and 720B includes an inner section extending generally perpendicularly from connecting portion 722, a middle section diverging outwardly from the inner section, and an outer section extending from middle section in a direction generally parallel to the inner section. As illustrated in FIG. 7, the middle section causes the inner section of a leg to be offset from the generally parallel outer section of the leg. This middle or single offset section is disposed in an area of the link which is between the slotted portions. In other words, no part of the middle or single offset section is in a portion of the leg which is slotted. Thus, the single offset section is not in contact with the connecting rods extending through the holes in the links. Alternatively, link 700 can have leg portions which are substantially straight. Link 700 can further have leg portions which diverge outwardly from opposite ends of connecting portion 722.

Link 700 of FIG. 7 can be arranged as one or more of links 800, 850, 900 and 950, as illustrated in FIGS. 8A, 8B, 9A and 9B, respectively. Further, links 800, 850, 900 and/or 950 can be arranged in any type of conveyor belt. For example, links 800, 850, 900 and/or 950 can be used in a grid-type belt (such as is shown in FIG. 1), a smaller-radius grid-type belt (such as is shown in FIG. 2), and/or a flat-wire conveyor belt (such as is shown in FIG. 3).

Figure 8A:
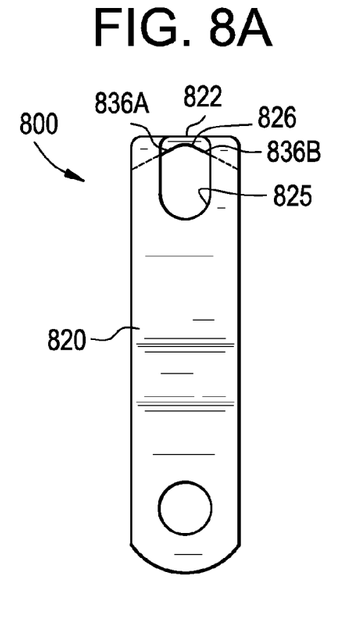
FIG. 8A is a side view of an improved link having a curved bearing surface according to embodiments of the invention.

FIGS. 8A-B and 9A-B illustrate side views of link 700 of FIG. 7 according to various embodiments of the invention. In FIG. 8A, connecting portion 822 of link 800 has a curved bearing surface 826 between first and second side surfaces, 836A and 836B, respectively. In this embodiment, curved bearing surface 826 substantially mates with the outer surface of a rod positioned in hole 825, i.e., curved bearing surface 826 and the rod positioned in hole 825 have substantially the same radius. First and second side surfaces 836A and 836B extend from curved bearing surface 826 at the distal end of leg portion 820 toward the proximal end of leg portion 820. In this embodiment, first and second side surfaces 836A and 836B are tangent planes to the curved surface of a rod positioned in hole 825. Further, first and second side surfaces 836A and 836B continue to extend tangentially beyond hole 825.

Figure 8B:
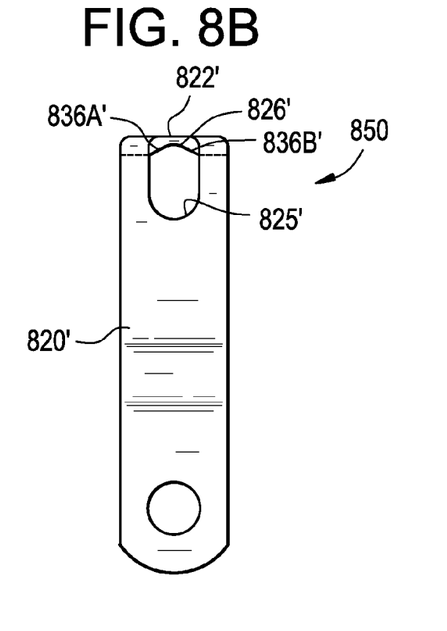
FIG. 8B is a side view of an improved link having a curved bearing surface according to embodiments of the invention.
Figure 10A:
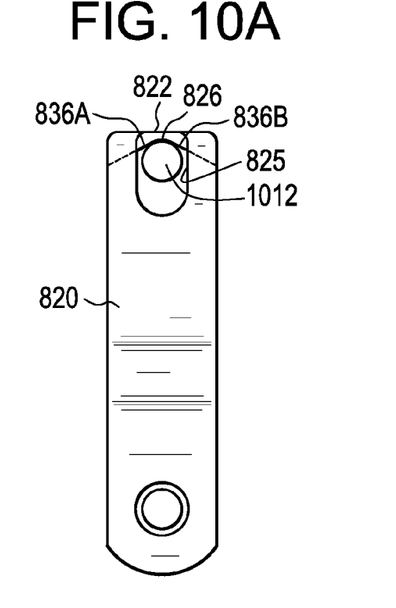
FIG. 10A is a cutaway view of a conveyor belt comprising the improved link of FIG. 8A according to embodiments of the invention.
Figure 10B:
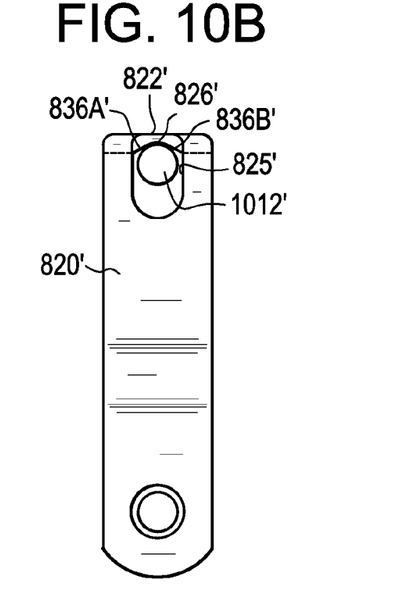
FIG. 10B is a cutaway view of a conveyor belt comprising the improved link of FIG. 8B according to embodiments of the invention.

According to the embodiment shown in FIG. 8B, connecting portion 822' of link 850 has a curved bearing surface 826' between first and second side surfaces, 836A' and 836B'. First and second side surfaces 836A' and 836B' of link 850 extend tangentially within hole 825', then extend perpendicularly to leg portion 820' outside of hole 825'. FIGS. 10A and 10B illustrate side views of links 800 and 850 with pivot rods 1012 and 1012' positioned therein, respectively.

Figure 9A:
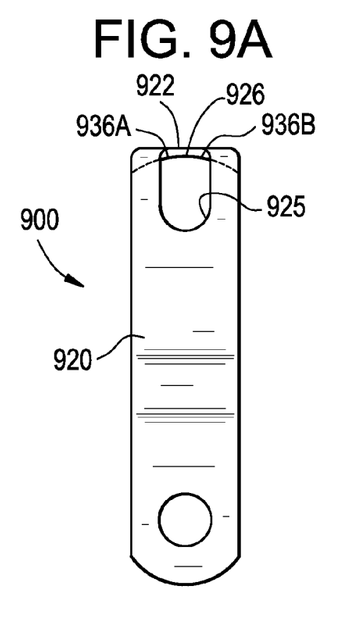
FIG. 9A is a side view of an improved link having a curved bearing surface according to embodiments of the invention.

In FIG. 9A, connecting portion 922 of link 900 has a curved bearing surface 926 between first and second side surfaces, 936A and 936B, respectively. In this embodiment, curved bearing surface 926 has a greater radius than a rod positioned in hole 925. First and second side surfaces 936A and 936B extend from curved bearing surface 926 at the distal end of leg portion 920 toward the proximal end of leg portion 920. In this embodiment, first and second side surfaces 936A and 936B also have a radius greater than that of a rod positioned in hole 925. In one example, first and second side surfaces 936A and 936B can have the same radius as that of curved bearing surface 926. In another example, first and second side surfaces 936A and 936B can have a larger radius than that of curved bearing surface 926.

Figure 9B:
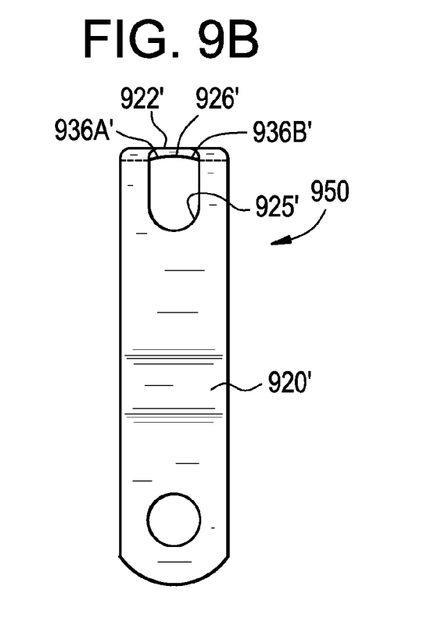
FIG. 9B is a side view of an improved link having a curved bearing surface according to embodiments of the invention.
Figure 11A:
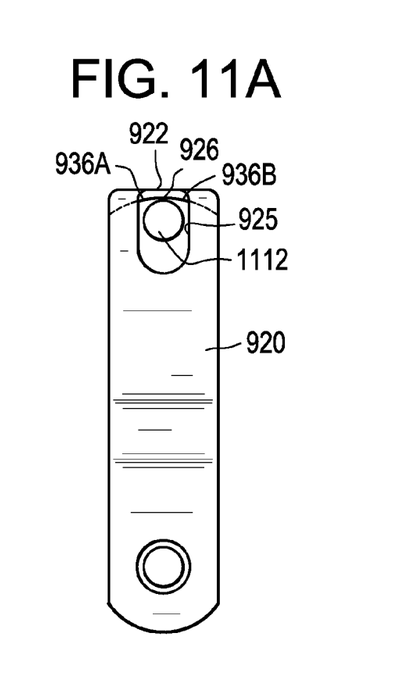
FIG. 11A is a cutaway view of a conveyor belt comprising the improved link of FIG. 9A according to embodiments of the invention.
Figure 11B:
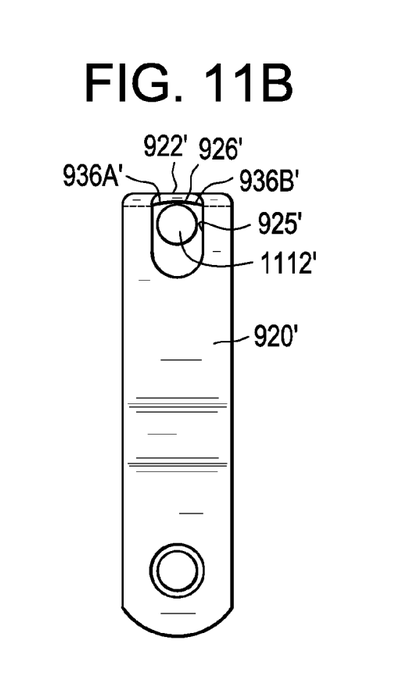
FIG. 11B is a cutaway view of a conveyor belt comprising the improved link of FIG. 9B according to embodiments of the invention.

According to the embodiment shown in FIG. 9B, connecting portion 922' of link 950 has a curved bearing surface 926' between first and second side surfaces, 936A' and 936B'. First and second side surfaces 936A' and 936B', respectively, of link 950 have the same radius as curved bearing surface 926' within hole 925', then extend perpendicularly to leg portion 920' outside of hole 925'. FIGS. 11A and 11B illustrate side views of links 900 and 950 with pivot rods 1112 and 1112' positioned therein, respectively.

According to other embodiments, the curved bearing surface can substantially mate with the outer surface of a rod positioned in the slotted opening (i.e., curved bearing surface and a rod have substantially the same radius), while first and second side surfaces extending from the curved bearing surface have a radius greater than that of the rod. According to still another embodiment, the curved bearing surface can have a radius smaller than that of the rod, such that the rod contacts the curved bearing surface at two points only.

Further, any of the embodiments described above can be modified such that the curved bearing surface is convex in shape, and/or the first and second side surfaces extend from the curved bearing surface toward the distal end of the leg portion and away from the proximal end of the leg portion. In addition, any of the embodiments described above can have first and second side surfaces that are not identical or symmetrical, e.g., a first side surface that is tangent to the rod, and a second side surface that is curved. The curved bearing surface can have a curvature reflecting that of any shape, such as a circle, an ellipse, a parabola, and the like.

The curved bearing surface according to embodiments of the invention can be formed, by example, by a coining process, wherein the material of the connecting portions is compressed to a maximum reduced thickness. Thus, the compressed, reduced thickness area becomes a work-hardened area of the connecting portions. The curved bearing surface can be made by other processes as well, such as by use of a forming die, which could be used for thinner material such as is used in flat-wire conveyor belts, resulting in less work-hardening. The curved bearing surface can also be machined, cast, molded, or the like, without work hardening.

To further maximum operation of the conveyor belt according to the disclosed embodiments, the angle of the tangential surfaces created with respect to adjacent links can be selected. For example, the angle of first and second side surfaces of a first link can be less than the relative angle between the first link and a second, adjacent link traveling around roller 110 of FIG. 4, for example. Thus, movement of the pivot rod from the curved bearing surface is facilitated. In another example, the angle of the first and second side surfaces of a first link can be greater than the relative angle between the first link and a second, adjacent link traveling around roller 110. Thus, movement of the pivot rod from the curved bearing surface is inhibited. In still another example, the angle of the first and second side surfaces of a first link can be equal to the relative angle between the first link and a second, adjacent link traveling around roller 110.

Figure 12:
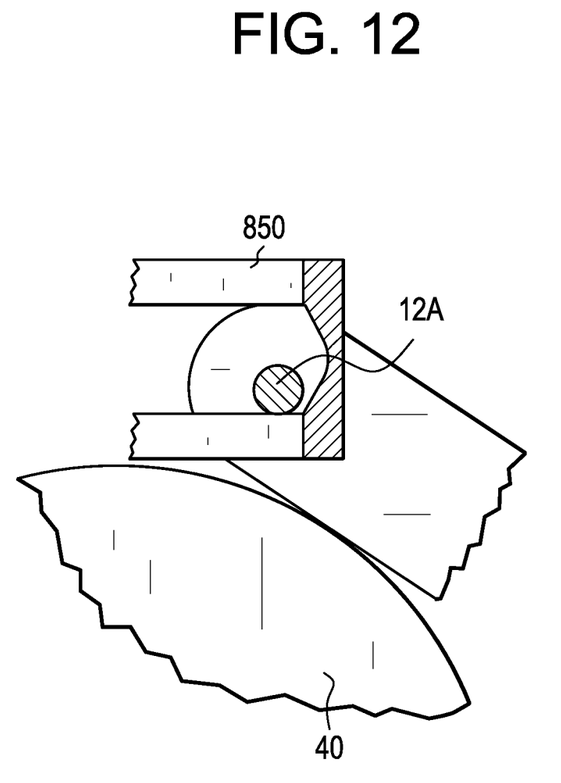
FIG. 12 is a cutaway view of a conveyor belt comprising the improved link of FIG. 8B having a curved bearing surface passing around a roller.

FIG. 12 illustrates the tangential movement of link 850 about roller 40. As shown in FIG. 12, rod 12A is not forced about a corner between the curved bearing surface and the opening of link 850 when link 850 is turned tangentially in the expanded position about roller 40 as with conventional links. Thus, the potentially objectionable noise created by this movement is eliminated.

Embodiments of the invention have been described in relation to particular examples, which are intended in all respects to be illustrative rather than restrictive. Those skilled in the art will appreciate that many different combinations of materials and components will be suitable for practicing the various embodiments of the invention.

Other embodiments of the invention will be apparent to those skilled in the art from consideration of the specification and practice disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A conveyor belt comprising:
a plurality of link members, each link member comprising:
a pair of leg portions, each leg portion comprising a first opening at a distal end and a second opening at a proximal end; and
a connecting portion arranged horizontally between and connecting the pair of leg portions at the distal ends, the connecting portion comprising a first surface facing towards the proximal ends of the pair of leg portions, the first surface comprising a curved bearing surface, a first side surface and a second side surface, the curved bearing surface being arranged vertically between the first side surface and the second side surface;
a first pivot rod received in the first opening of each leg portion; and
a second pivot rod received in the second opening of each leg portion,
wherein the curved bearing surface, the first side surface and the second side surface define a concave portion of the first surface within the first openings of the pair of leg portions.

2. The conveyor belt of claim 1, wherein the curved bearing surface has a radius less than a radius of the first pivot rod.

3. The conveyor belt of claim 1, wherein the curved bearing surface has a radius greater than or equal to a radius of the first pivot rod.

4. The conveyor belt of claim 1, wherein the first and second side surfaces have a radius greater than or equal to the radius of the first pivot rod.

5. The conveyor belt of claim 1, wherein the first and second side surfaces are planar.

6. The conveyor belt of claim 1, wherein the first and second side surfaces extend tangentially from ends of the curved bearing surface.

7. The conveyor belt of claim 1, further comprising:
a roller parallel to the first and second pivot rods upon which the plurality of link members overturn,
wherein each of the plurality of link members are tangent planes to a surface of the roller,
wherein a first angle is defined between tangent planes of adjacent link members of the surface of the roller, and
wherein at least one of the curved bearing surface, the first side surface and the second side surface is tangent to the first rod when tangent planes of adjacent link members are arranged at the first angle on the surface of the roller.

8. The conveyor belt of claim 1, wherein the first and second side surfaces are tangent planes to a surface of the first pivot rod.

9. The conveyor belt of claim 8, further comprising:
a roller parallel to the first and second pivot rods upon which the plurality of link members overturn,
wherein each of the plurality of link members are tangent planes to a surface of the roller,
wherein a first angle is defined between the first and second side surfaces, and wherein a second angle is defined between tangent planes of adjacent link members on the surface of the roller.

10. The conveyor belt of claim 9, wherein the first angle is less than the second angle.

11. The conveyor belt of claim 9, wherein the first angle is equal to the second angle.

12. The conveyor belt of claim 9, wherein the first angle is greater than the second angle.

13. The conveyor belt of claim 1, wherein the first opening is configured to allow the first pivot rod to bear against the connecting portion.

14. The conveyor belt of claim 1, wherein the first opening is slotted.

15. The conveyor belt of claim 1, wherein the second opening is a hole.

16. The conveyor belt of claim 1, wherein the plurality of link members are metal.

17. The conveyor belt of claim 16, wherein at least one of the curved bearing surface, first side surface and second side surface is a compressed work-hardened surface.

18. The conveyor belt of claim 1,
wherein the first pivot rod interconnects the plurality of link members with first adjacent link members, and
wherein the second pivot rod interconnects the plurality of link members with second adjacent link members.

19. The conveyor belt of claim 1, wherein the curved bearing surface is concave in shape.

20. The conveyor belt of claim 1, wherein the first and second side surfaces are convex in shape.

21. A link member comprising:
a pair of leg portions, each leg portion comprising a first opening at a distal end and a second opening at a proximal end; and
a connecting portion that connects the pair of leg portions at the distal ends, the connecting portion comprising a curved bearing surface between first and second side surfaces,
wherein the curved bearing surface and the first and second side surfaces define a cornerless cross-section of the connecting portion from a perspective through the first openings of the pair of leg portions.

22. The link member of claim 21, wherein the first and second side surfaces have a radius greater than or equal to a radius of the curved bearing surface.

23. The link member of claim 21, wherein the first and second side surfaces are flat.

24. The link member of claim 21, wherein the first opening is slotted.

25. The link member of claim 21, wherein the second opening is a hole.

26. The link member of claim 21, wherein the link member comprises metal.

27. The link member of claim 26, wherein at least one of the curved bearing surface, first side surface and second side surface is a compressed work-hardened surface.

28. The link member of claim 27, wherein the connecting portion and the leg portions together define a U-shape.

29. The link member of claim 28, wherein each of the leg portions comprise an outwardly diverging section.

30. The link member of claim 29, wherein the distal end of the leg portions is disposed between the connecting portion and the outwardly diverging section.

31. The link member of claim 30,
wherein the distal end of the leg portions extend in a direction perpendicular to the connection portion, and
wherein the proximal end of the leg portions extend away from the outwardly diverging section in a direction parallel to the distal end.

32. The link member of claim 21, wherein the curved bearing surface is concave in shape.

33. The link member of claim 21, wherein the first and second side surfaces are convex in shape.

34. The link member of claim 21, wherein the first and second side surfaces are planar.

35. The first member of claim 21, wherein the first and second side surfaces extend tangentially from ends of the curved bearing surface.

* * * * *